(12) United States Patent
Weng

(10) Patent No.: US 11,014,833 B2
(45) Date of Patent: May 25, 2021

(54) ENERGY SAVING DESALINATION SYSTEM

(71) Applicants: Ginger Water Processing Technology Co., Ltd., Hsinchu County (TW); Lin-Song Weng, Hsinchu County (TW)

(72) Inventor: Lin-Song Weng, Hsinchu County (TW)

(73) Assignees: GINGER WATER PROCESSING TECHNOLOGY CO., LTD., Zhubei (TW); Lin-Song Weng, Zhubei (TW)

( * ) Notice: Subject to any disclaimer, the term of this patent is extended or adjusted under 35 U.S.C. 154(b) by 239 days.

(21) Appl. No.: 16/379,495

(22) Filed: Apr. 9, 2019

(65) Prior Publication Data

US 2019/0308889 A1    Oct. 10, 2019

(30) Foreign Application Priority Data

Apr. 10, 2018  (TW) .................................. 107112319
Oct. 24, 2018  (TW) .................................. 107137581

(51) Int. Cl.

| | | |
|---|---|---|
| *C02F 1/44* | (2006.01) | |
| *C02F 1/48* | (2006.01) | |
| *C02F 1/04* | (2006.01) | |
| *C02F 1/12* | (2006.01) | |
| *C02F 1/00* | (2006.01) | |

(Continued)

(52) U.S. Cl.

CPC ................ *C02F 1/441* (2013.01); *B01D 1/28* (2013.01); *C02F 1/041* (2013.01); *C02F 1/12* (2013.01); *C02F 1/14* (2013.01); *C02F 1/481* (2013.01); *B01D 1/0035* (2013.01); *B01D 5/006* (2013.01); *C02F 1/001* (2013.01); *C02F 2103/08* (2013.01);

(Continued)

(58) Field of Classification Search

CPC .......... C02F 1/441; C02F 1/481; C02F 1/041; C02F 1/12; C02F 1/001; C02F 2201/009; C02F 2103/08; C02F 2303/10; C02F 9/00; C02F 1/48; C02F 1/02; C02F 1/265; C02F 1/14; B01D 1/28; B01D 1/0035; B01D 5/006; Y02W 10/30; Y02A 20/142; Y02A 20/212; Y02A 20/124

See application file for complete search history.

(56) References Cited

FOREIGN PATENT DOCUMENTS

CN          105836948 A  *  8/2016

\* cited by examiner

*Primary Examiner* — Krishnan S Menon
*Assistant Examiner* — Waqaas Ali
(74) *Attorney, Agent, or Firm* — Birch, Stewart, Kolasch & Birch, LLP

(57) ABSTRACT

An energy-saving desalination system, used for obtaining a salt water from a salt-water source and desalinating to generate a fresh water, and the system includes: a salt-water magnetizing device disposed at an intake for magnetizing the salt water to generate a magnetized salt water; a salt-water filtering device coupled to the salt-water magnetizing device for filtering the magnetized salt water; a salt-water preheating device coupled to the salt-water filtering device for heating the magnetized salt water to reach a middle temperature; a salt-water reheating device coupled to the salt-water preheating device for heating the magnetized salt water to maintain in a higher temperature range; a nebulization device coupled to the salt-water reheating device to nebulize the magnetized salt water having a higher temperature into a mixing fog; and a condensing device coupled to the nebulization device to extract a fresh water from the mixing fog. Wherein a condensation water required by the condensing device is a salt water extracted from the salt-water source.

22 Claims, 8 Drawing Sheets

(51) Int. Cl.
  *B01D 1/00* (2006.01)
  *B01D 5/00* (2006.01)
  *C02F 1/14* (2006.01)
  *B01D 1/28* (2006.01)
  *C02F 103/08* (2006.01)
(52) U.S. Cl.
  CPC .... *C02F 2201/009* (2013.01); *C02F 2303/10* (2013.01)

ENERGY SAVING DESALINATION SYSTEM

BACKGROUND OF THE INVENTION

1. Field of the Invention

The present invention relates to a desalination system, specifically to an energy-saving desalination system.

2. Description of Related Art

The vast majority of the water on Earth is in the form of seawater, for about 97% of the earth's surface. However, the seawater is a salt water, which cannot be used as drinking or irrigating water. In other words, the fresh water that naturally exists on the surface of the Earth only accounts for 3%, and most of the fresh water also exists on the surface in the form of glaciers. Therefore, the technology to convert the salt water into usable fresh water has great application requirements.

The existing techniques for desalination of the salt water are mainly divided into two major categories: an evaporation method and a thin-film method. The basic principle of the evaporation method is to directly vaporize the salt water under reduced pressure so that the salt water can be evaporated under relatively low temperature conditions. A large amount of vapor emerges after the evaporation. After that, humans use different evaporation methods and condensation methods to achieve different speeds and results in condensing fresh water. These methods include multi-effect evaporation, multi-stage flash and vapor compression. But when manufacturing the fresh water by these methods, a lot of energy is consumed to generate steam. The thin-film method mainly includes reverse osmosis method and electrodialysis method. Although the basic principle is to filter the salt water with a semipermeable membrane, the salt ions in the salt water is blocked by the semipermeable membrane, and the water is directly passed through the semipermeable membrane to obtain fresh water. However, since the size of the salt ions is small, the conventional thin film method requires a semi-permeable membrane having a small pore size, which is technically difficult and has high maintenance cost.

SUMMARY OF THE INVENTION

Accordingly, the way to effectively transform the salt water into a fresh water is required to be solved by the industry.

The present invention provides an energy-saving desalination system, used for obtaining a salt water from a salt-water source and desalinating to generate a fresh water, and the system comprising: a salt-water magnetizing device disposed at an intake for magnetizing the salt water to generate a magnetized salt water; a salt-water filtering device coupled to the salt-water magnetizing device for filtering the magnetized salt water; a salt-water preheating device coupled to the salt-water filtering device for heating the magnetized salt water such that the magnetized salt water can reach a middle temperature; a salt-water reheating device coupled to the salt-water preheating device for heating the magnetized salt water such that the magnetized salt water can maintain in a higher temperature range; a nebulization device coupled to the salt-water reheating device to nebulize the magnetized salt water having a higher temperature into a mixing fog; and a condensing device coupled to the nebulization device to extract a fresh water from the mixing fog; wherein a condensation water required by the condensing device is a salt water extracted from the salt-water source.

The present invention also provides with another energy-saving desalination system, used for obtaining a salt water from a salt-water source and desalinating to generate a fresh water, and the system comprising: a salt-water magnetizing device disposed at an intake for magnetizing the salt water to generate a magnetized salt water; a salt-water filtering device coupled to the salt-water magnetizing device for filtering the magnetized salt water; a salt-water preheating device coupled to the salt-water filtering device for heating the magnetized salt water such that the magnetized salt water can reach a middle temperature; a nebulization device coupled to the salt-water reheating device to nebulize the magnetized salt water having a higher temperature into a mixing fog; a mixing-fog heating device coupled to the nebulization device to heat the mixing fog such that the magnetized salt water can maintain in a higher temperature range; and a condensing device coupled to a salt-water reheating device to condense the mixing fog to extract out a fresh water; wherein a condensation water required by the condensing device is a salt water extracted from the salt-water source.

In an embodiment of the energy-saving desalination system provided by the present invention, the salt-water preheating device is a portion of the condensing device. Preferably, the condensing device includes a fresh-water extraction device and a salt-water extraction device, and the fresh-water extraction device is simultaneously as the salt-water preheating device.

In an embodiment of the energy-saving desalination system provided by the present invention, the salt-water reheating device can be a solar water heater, an electric heater, a gas water heater, or a combination thereof.

In an embodiment of the energy-saving desalination system provided by the present invention, the system further includes a re-magnetizing device disposed at a path that the magnetized salt water flows through in order to perform a second magnetization to the magnetized salt water.

In an embodiment of the energy-saving desalination system provided by the present invention, the he mixing-fog heating device is a solar heat transfer oil generator.

One of the advantages of the above embodiment is that the kinetic energy required for the operation of the overall system is reduced, and using the characteristics of the salt water after being magnetized, directly extracting the salt water (seawater) as a condensing water required extracting the fresh water in the system in order to achieve the energy-saving effect. Cooperating with other green energy, for example, a heating design in a solar energy form so that the power consumption of the overall system is reduced.

DETAILED DESCRIPTION OF THE PREFERRED EMBODIMENT

Figure 1:
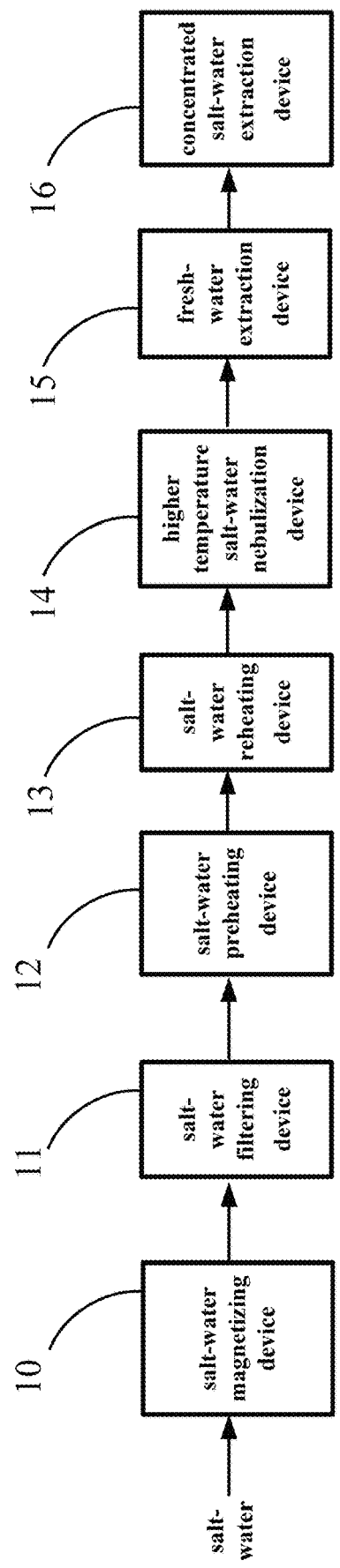
FIG. 1 is a block diagram of an energy-saving desalination system according to a first embodiment of the present invention.

FIG. 1 is a block diagram of an energy-saving desalination system according to a first embodiment of the present invention. A salt water (for example, a seawater) is inputted to a salt-water magnetizing device 10 to be magnetized, and then being filtered by a salt-water filtering device 11 to filter out impurities in the magnetized salt water. The salt water being magnetized and filtered is heated in a salt-water preheating device 12 to a middle temperature such as 20 degrees to 40 degrees Celsius. Then, the magnetized salt water having the middle temperature enters a salt-water reheating device 13 to be further heated to a magnetized salt water having a higher temperature. A higher temperature salt-water nebulization 14 can be a pneumatic nozzle or an ultrasonic nozzle for nebulizing the magnetized salt water having the higher temperature to become a mixing fog having the higher temperature. A fresh-water extraction device 15 extracts a seawater as a condensation water to condensate the mixing fog having the higher temperature to obtain a fresh water. A remaining portion of the mixing fog enters a concentrated salt-water extraction device 16, and using a depressurized condensation pipe to be cooperated with a demisting mesh to convert the remaining portion of the mixing fog into a concentrated salt water, and the concentrated salt water is also known as a brine.

In the present embodiment, the salt-water filtering device 11 can also adopt a filtering device that is simple and has lower cost. In different application environment, a filtering device that is more precise can be selected according to requirement.

Figure 2:
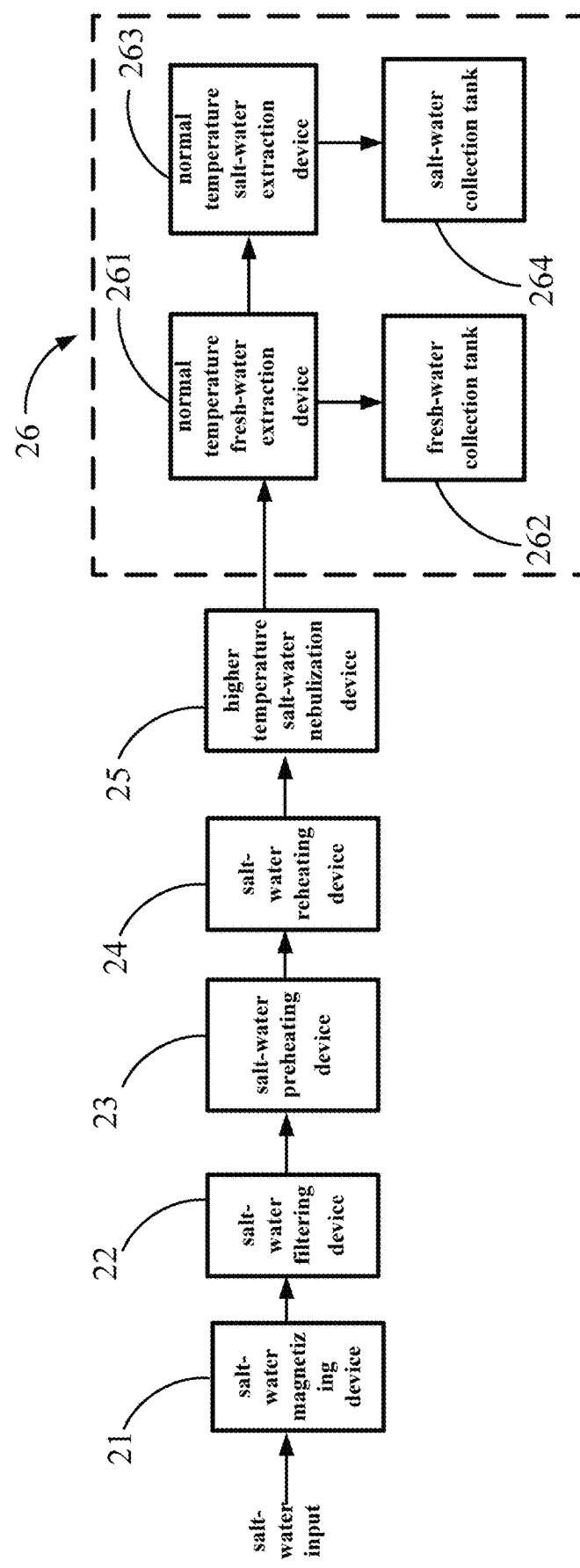
FIG. 2 is a block diagram of a variation of the embodiment of the FIG. 1.

FIG. 2 is a variation of the embodiment of the FIG. 1. After the salt water (such as the seawater) is magnetized by a salt-water magnetizing device 21, the salt water is filtered by the salt-water filtering device 22 in order to filter out the impurity in the magnetized salt water. The salt water being magnetized and filtered is heated in a salt-water preheating device 23 to a middle temperature such as 20 degrees to 40 degrees Celsius. Then, the salt water having the middle temperature enters a salt-water reheating device 24 to be further heated to a higher temperature. A higher temperature salt-water nebulization device 25 that can be a pneumatic nozzle or an ultrasonic nozzle for nebulizing the magnetized salt water having the middle temperature to become a mixing fog. Then, inputting to a condensing device 26. The condensing device 26 includes a fresh-water extraction device 261, a fresh-water collection tank 262, a salt-water extraction device 263 and a concentrated salt-water collection tank 264. The mixing fog is condensed to extract a fresh water by a first pressure and a first temperature in the fresh-water extraction device 261, and stored in the fresh-water collection tank 262. A remaining portion of the mixing fog after being extracted with the fresh water is delivered to the salt-water extraction device 263 to extract a concentrated salt water by a second pressure and a second temperature, and being stored in the concentrated salt-water collection tank 264. The first temperature and the second temperature can be 0 degree to 40 degrees Celsius, and the above temperatures are relative to the temperature of a local seawater introduced by the desalination system.

The salt water after being strongly magnetized can decrease the generation of the incrustant when heating and condensing. In the present embodiment, the salt-water preheating device 23 can select a solar water heater as a heating device.

Figure 3:
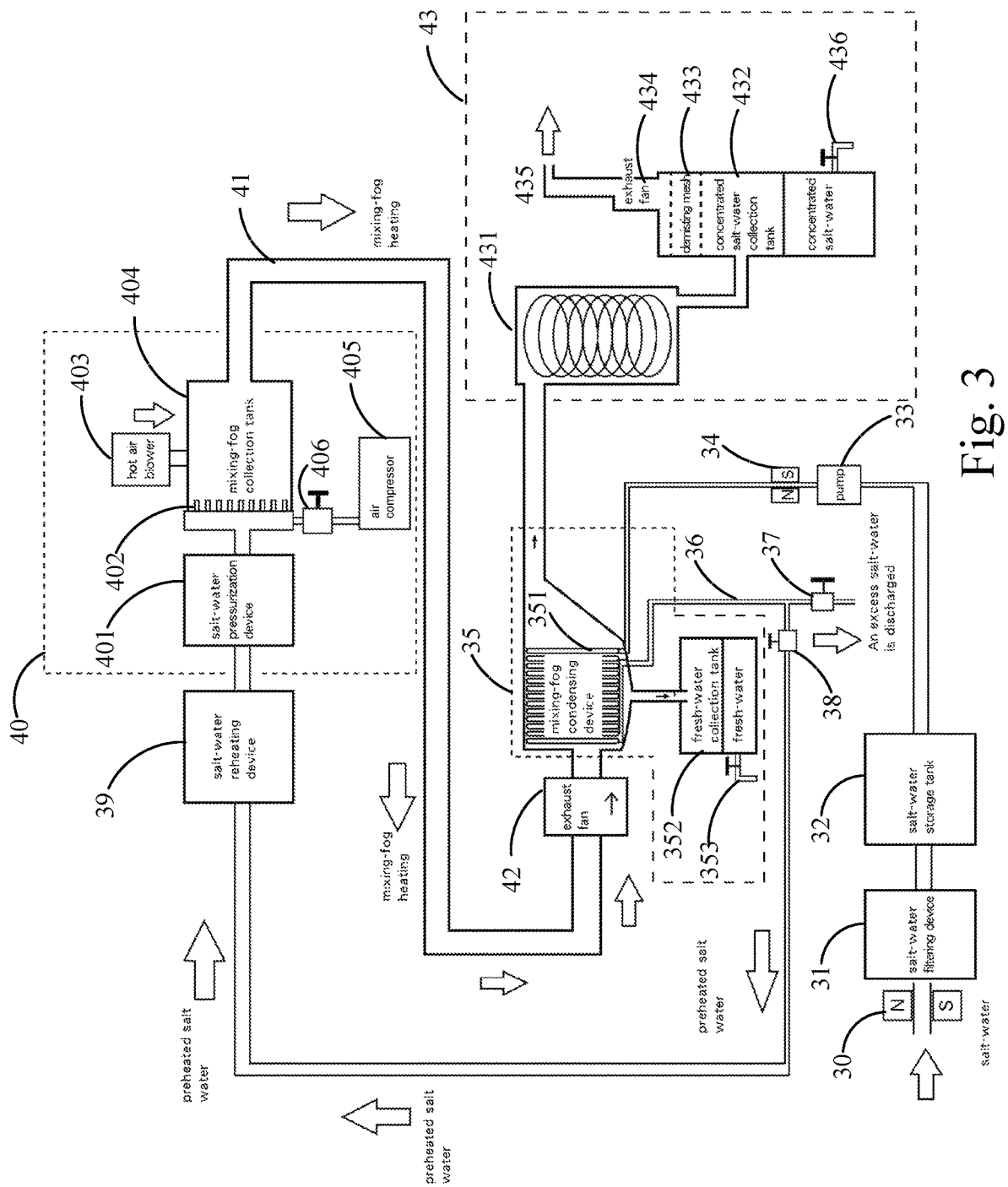
FIG. 3 is a schematic diagram of an energy-saving desalination system according to an embodiment of the present invention.

FIG. 3 is a schematic diagram of an energy-saving desalination system according to an embodiment of the present invention. In the present embodiment, a salt-water outlet directly connects with a seawater, and the salt-water outlet such as an input terminal of a water pipe is installed with a strong magnet 30 to perform a first magnetization to the salt water passing through, after the salt water being magnetized is filtered out with the impurity by the salt-water filtering device 31, the salt water is stored in a salt-water storage tank 32. A pump 33 is used to extract the salt water stored in the salt-water storage tank 32 and make the salt water to pass through strong magnet 34. After performing a second magnetization, delivering to a mixing-fog condensing device 351 of a fresh-water extraction device 35 as a condensation water for condensing a mixing fog after being heated and blowing by an exhaust fan 42.

The salt water after magnetizing twice, at this stage, as a condensation water, the salt water is also heated by a mixing fog after being heated so as to become preheated salt water having a middle temperature. The preheated salt water having the middle temperature is stored in the condensate output pipe (an output pipe of the preheated salt water after being heated) 36, the preheated salt-water flow control valve 38 controls to provide the water volume required to be nebulized for the system to a salt-water reheating device 39. An excess salt water is discharged into the sea through a salt-water discharging control valve 37. The salt-water reheating device 39 can be a solar water heater, an electric heater, a gas water heater, or a combination thereof for heating the preheated salt water having the middle temperature to a higher temperature to provide to a higher temperature nebulization device 40.

The higher temperature salt-water nebulization device 40 can control the salt-water pressurization device 401 and a high pressure air delivered from the air flow control valve 406 that the nozzle 402 cooperates with air compressor 405 such that the salt water having a higher temperature is nebulized as a mixing fog including a salt-water mist component and a fresh-water mist component, and stored the mixing fog in a mixing fog collection tank 404. To maintain the temperature of the mixing fog in a higher temperature range, the present embodiment also provides with a hot air blower 403 to provide an air volume for blowing the mixing fog. The hot air blower 403 can be a solar hot air blower, an electric hot air blower, or a gas hot air blower. The higher temperature mixing fog is further drawn by the exhaust fan 42 to the fresh-water extraction device 35 through the mixing-fog delivering pipe 41, and using a mixing-fog condensing device 351 to extract out a fresh water with a first temperature and a first pressure, and stored in the fresh-water collection tank 352. An user can use the fresh water through a faucet 353. A remaining portion of the mixing fog having a lower temperature and high concentration salt water is delivered to a concentrated salt-water extraction device 43 to extract a concentrated salt water by a second pressure and a second temperature through a depressurized condenser 431, and being stored in the concentrated salt-water collection tank 432. And can be discharged out of the system through a concentrated salt-water outlet 436. The gas portion is discharged out through the exhaust gas outlet 435 by providing power by the exhaust fan 434 and after being filtered with the impurity by the demisting mesh 433. In the present embodiment, the first temperature is different from the second temperature, and the first pressure is different from the second pressure.

Figure 4:
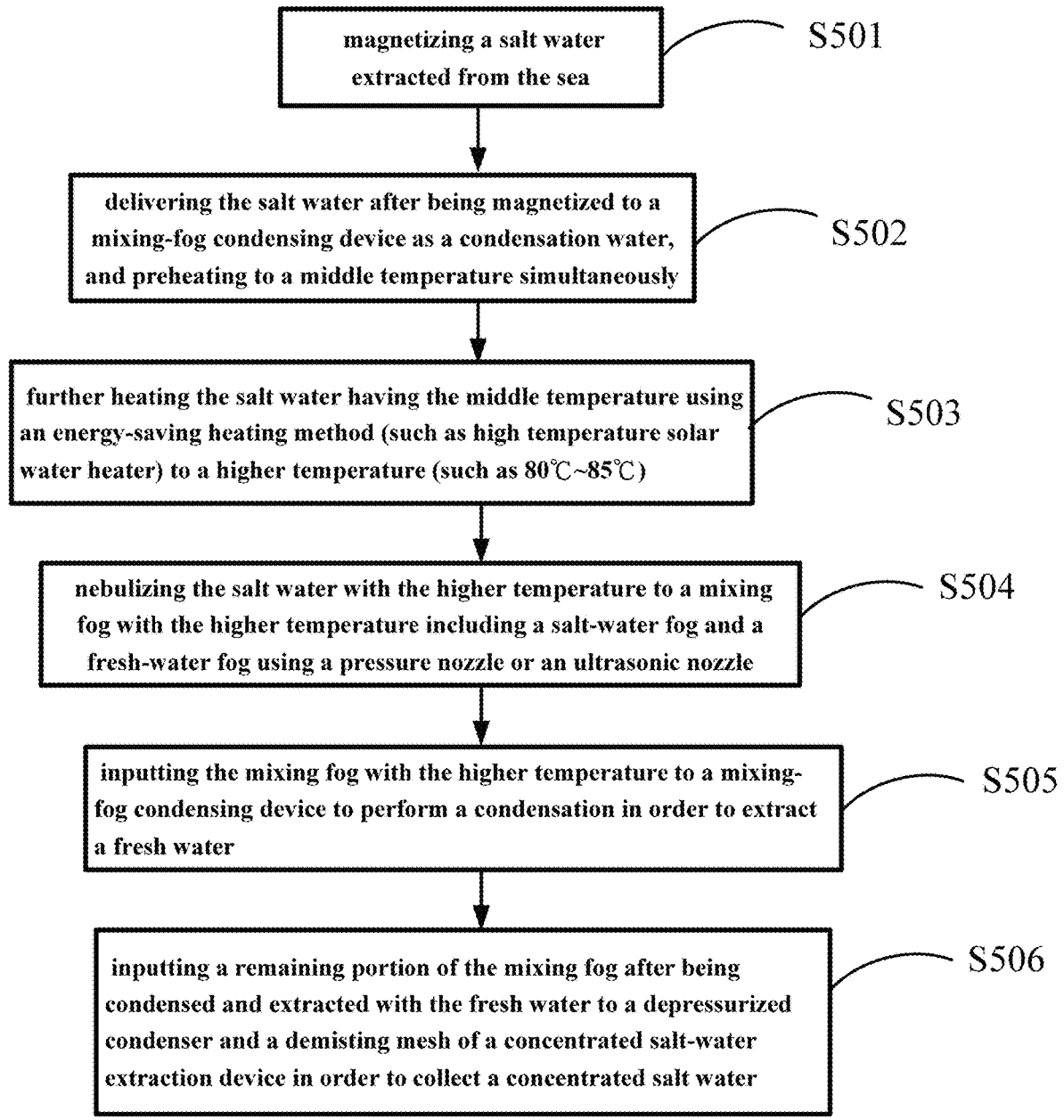
FIG. 4 is a flow chart of an energy-saving desalination system according to an embodiment of the present invention.

FIG. 4 is a flow chart of an energy-saving desalination system according to an embodiment of the present invention.

Step S501: magnetizing a salt water extracted from the sea;

Step S502: delivering the salt water after being magnetized to a mixing-fog condensing device as a condensation water, and preheating to a middle temperature simultaneously;

Step S503: further heating the salt water having the middle temperature using an energy-saving heating method (such as high temperature solar water heater) to a higher temperature (such as 80° C.~85° C.);

Step S504: nebulizing the salt water with the higher temperature to a mixing fog with the higher temperature including a salt-water fog and a fresh-water fog using a pressure nozzle or an ultrasonic nozzle;

Step S505: inputting the mixing fog with the higher temperature to a mixing-fog condensing device to perform a condensation in order to extract a fresh water;

Step S506: inputting a remaining portion of the mixing fog after being condensed and extracted with the fresh water to a depressurized condenser and a demisting mesh of a concentrated salt-water extraction device in order to collect a concentrated salt water.

Figure 5:
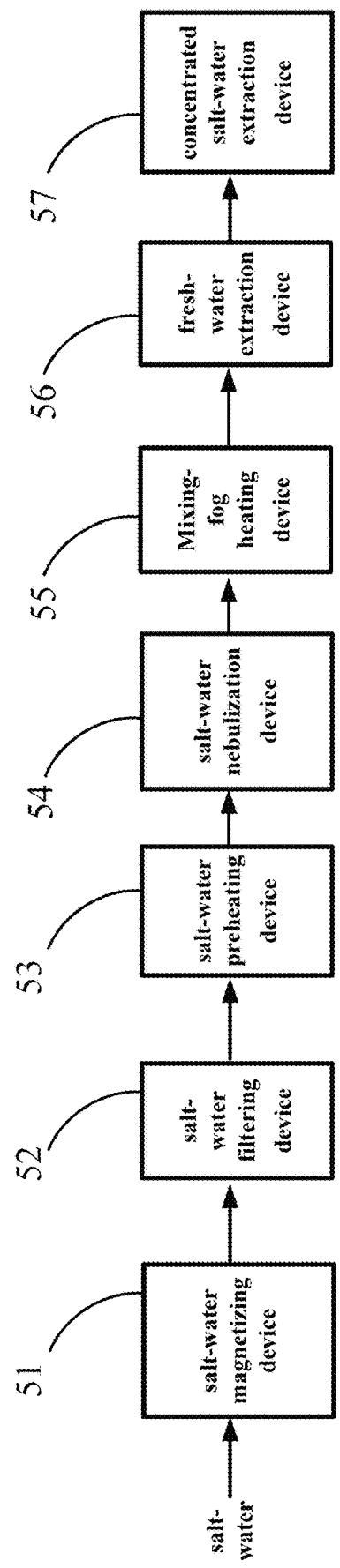
FIG. 5 is a block diagram of an energy-saving desalination system according to a second embodiment of the present invention.

FIG. 5 is a block diagram of an energy-saving desalination system according to a second embodiment of the present invention. In the present embodiment, a salt water is inputted to a salt-water magnetizing device 51 to be magnetized, and then being filtered by a salt-water filtering device 52. The salt water is heated in a salt-water preheating device 53 to a middle temperature. Then, the salt water is nebulized to a mixing fog having the middle temperature in a salt-water nebulization device 54 using a mechanism such as an ultrasonic nozzle. Then, using a mixing-fog heating device 55 to heat the mixing fog to a higher temperature and inputting to a fresh-water extraction device 56 in order to condense to obtain a fresh water. The remaining portion of the mixing fog is delivered to the concentrated salt-water extraction device 57 to obtain a concentrated salt water.

Figure 6:
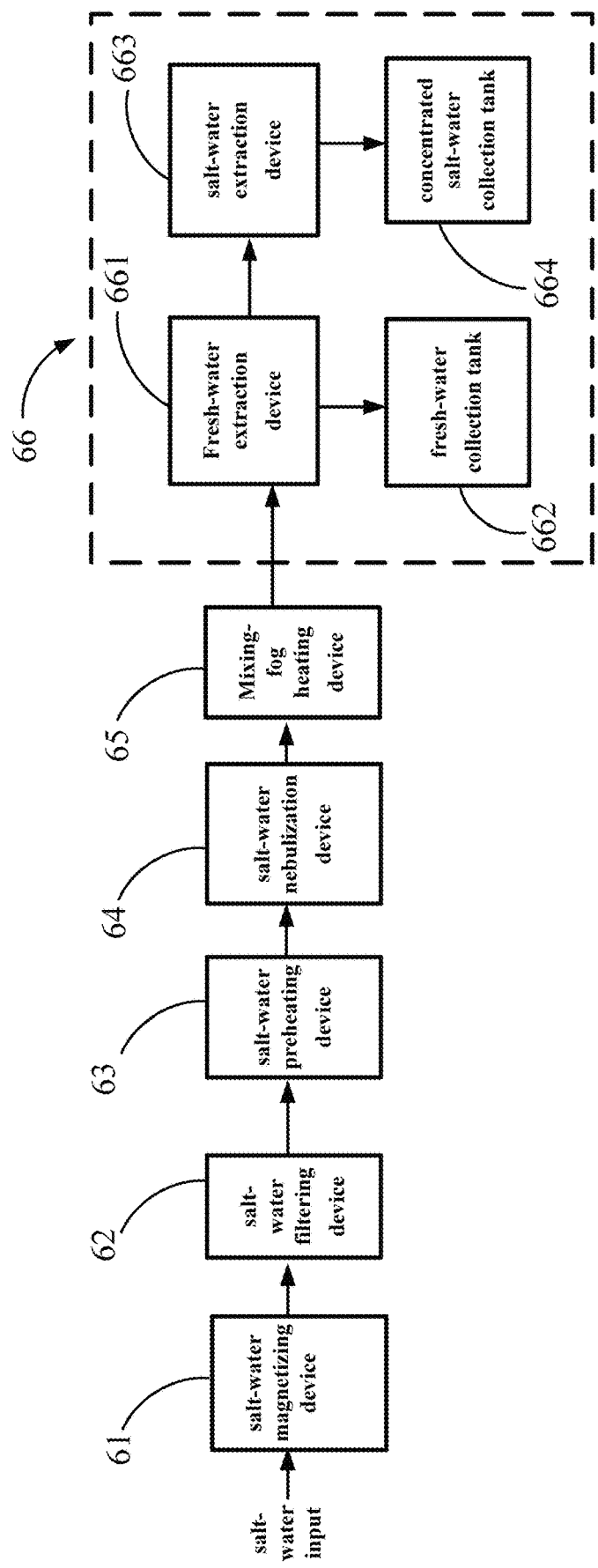
FIG. 6 is a block diagram of a variation of the embodiment of the FIG. 5.

FIG. 6 is a variation of the embodiment of the FIG. 5. Similarly to FIG. 2, after the salt water is magnetized by a salt-water magnetizing device 61, the salt water is filtered by the salt-water filtering device 62, heated in a salt-water preheating device 63 to a middle temperature. Then, the salt water is nebulized to a mixing fog having a middle temperature by a salt-water nebulization device 64. Then, heating to a higher temperature through a mixing-fog heating device 65, and inputting to a condensing device 66. The condensing device 66 includes a fresh-water extraction device 661, a fresh-water collection tank 662, a salt-water extraction device 663 and a concentrated salt-water collection tank 664. The mixing fog with the higher temperature is condensed and extracted to obtain a fresh water under a first pressure and a first temperature by a fresh-water extraction device 661, and stored in the fresh-water collection tank 662. A remaining portion of the mixing fog after being extracted to obtain the fresh water is delivered to a salt-water extraction device 663 to extract and obtain a concentrated salt-water extraction device 663 under a second pressure and a second temperature to obtain a concentrated salt water, and stored in a concentrated salt-water collection tank 664.

Figure 7:
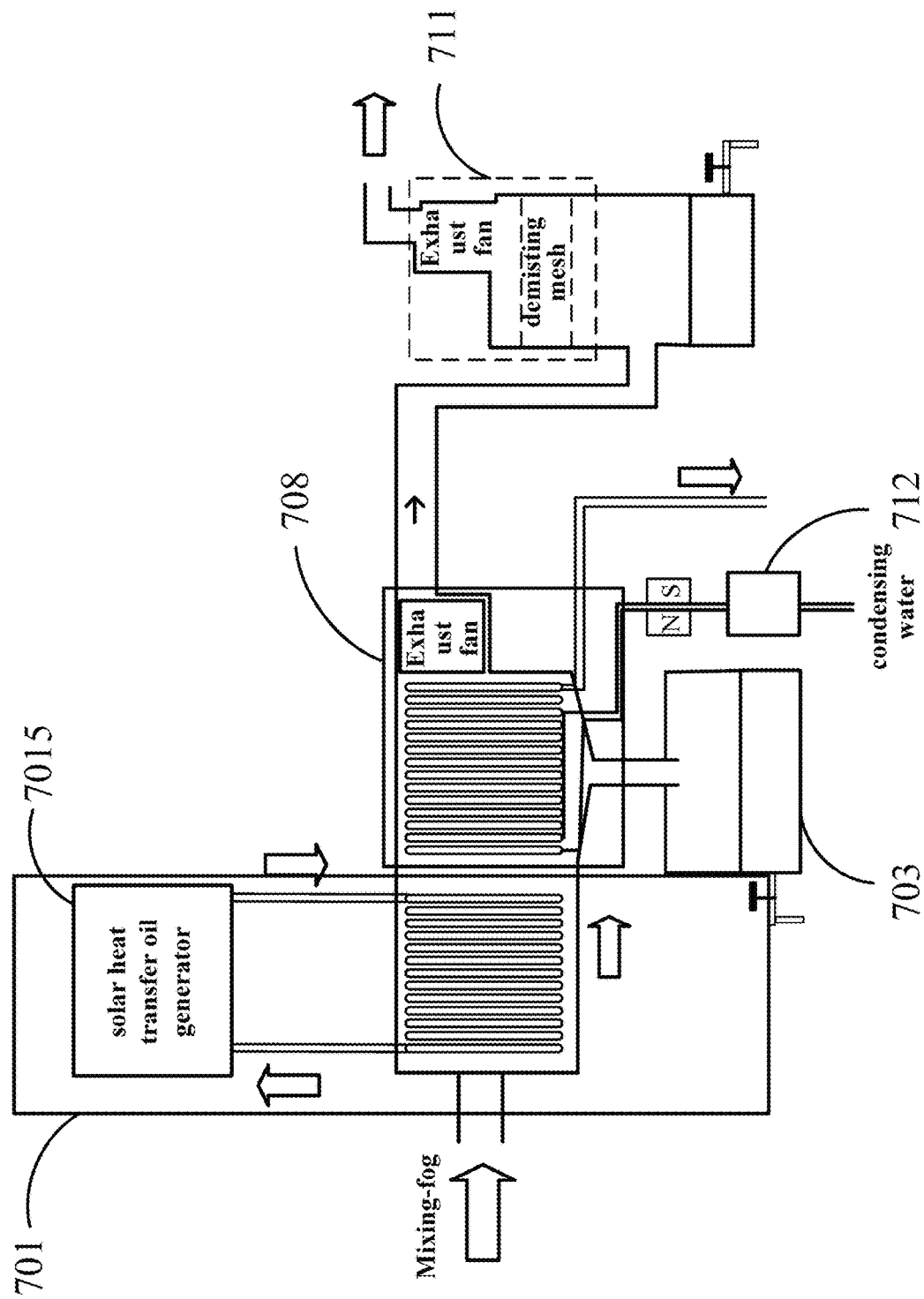
FIG. 7 is a schematic diagram of a condensing device according to one embodiment.

FIG. 7 is a schematic diagram of a condensing device according to one embodiment. With also reference to FIG. 6, the mixing fog having the middle temperature generated in the salt-water nebulization device 64 is inputted to a mixing-fog heating device 701. The heating energy of the mixing-fog heating device 701 is provided by a solar heat transfer oil generator 7015. The heat transfer oil heats the mixing fog to a required temperature through a heating pipe. The mixing fog after being heated enters to the fresh-water extraction device 708. The condensation water of the fresh-water extraction device 708 is provided by the pump 712 that extracts a salt water (seawater). The fresh water extracted is stored in the fresh-water collection tank 703. The remaining fog is blown to the salt-water extraction device 711 to extract out concentrated salt water and discharge an exhaust gas.

Figure 8:
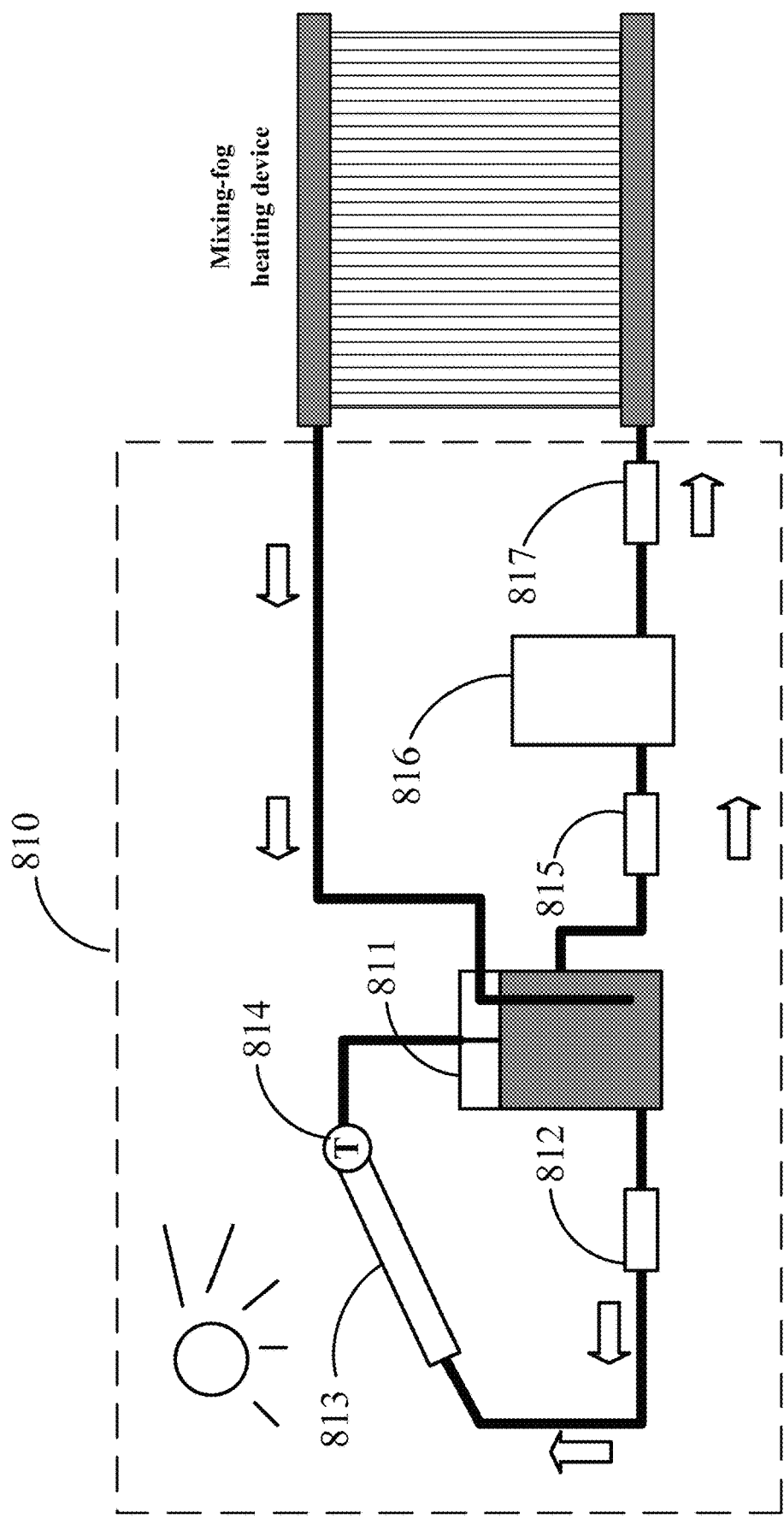
FIG. 8 is a schematic diagram of a solar heat transfer oil generator of FIG. 7.

FIG. 8 is a schematic diagram of a solar heat oil generator of FIG. 7. In the present embodiment, the solar heat transfer oil generator 810 mainly includes a heat collection plate 813, a heat oil collection barrel 814, and a storage oil barrel 811 and a heat transfer oil boiler 816. The flow of the heat transfer oil is promoted by the pumps 812, 815 and 817. The pump 815 draws the heat transfer oil from the oil storage barrel 811 and sends it to the heat transfer oil boiler for heating (in this case, when the heating amount in the winter or solar energy is insufficient, the circulating oil can be heated by the heat transfer oil boiler) to a higher temperature. The pump 817 will send the heat transfer oil having the higher temperature into the heating pipe for heating the mixing fog. Then, flowing back to the oil storage barrel 811. At the same time, the pump 812 will also deliver the heat transfer oil in the oil storage barrel to the heat collection plate 813 and the heat collection oil barrel 814 to maintain the heat transfer oil in the system to a stable higher temperature through the temperature provided by the solar energy in order to decrease the heat energy consumed by the heat transfer oil boiler 816 and shorten a heating time that the heat transfer oil can reach the higher temperature.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. An energy-saving desalination system, used for obtaining a salt water from a salt-water source and desalinating to generate a fresh water, and the system comprising:

a salt-water magnetizing device disposed at an intake for magnetizing the salt water to generate a magnetized salt water;

a salt-water filtering device coupled to the salt-water magnetizing device for filtering the magnetized salt water;

a salt-water preheating device coupled to the salt-water filtering device for heating the magnetized salt water such that the magnetized salt water can reach a middle temperature;

a salt-water reheating device coupled to the salt-water preheating device for heating the magnetized salt water such that the magnetized salt water can maintain in a higher temperature range;

a nebulization device coupled to the salt-water reheating device to nebulize the magnetized salt water having a higher temperature into a mixing fog; and a condensing device coupled to the nebulization device to extract a fresh water from the mixing fog;

wherein a condensation water required by the condensing device is a salt water extracted from the salt-water source.

2. The desalination system according to claim 1, wherein the salt-water preheating device is a portion of the condensing device.

3. The desalination system according to claim 1, wherein the condensing device includes a fresh-water extraction device and a salt-water extraction device, and the fresh-water extraction device is simultaneously as the salt-water preheating device.

4. The desalination system according to claim 1, wherein the nebulization device includes a pressurization device and a nozzle.

5. The desalination system according to claim 1, wherein the salt-water reheating device can be a solar water heater, an electric heater, a gas water heater, or a combination thereof.

6. The desalination system according to claim 1, wherein the system further includes a re-magnetizing device disposed at a path that the magnetized salt water flows through in order to perform a second magnetization to the magnetized salt water.

7. The desalination system according to claim 6, wherein the salt-water magnetizing device and the re-magnetizing device are realized by a strong magnet.

8. The desalination system according to claim 3, wherein the system further includes a salt-water discharging control valve for discharging an excess condensation water out of the system.

9. The desalination system according to claim 1, wherein the middle temperature is in a range of 20 degrees to 40 degrees Celsius.

10. The desalination system according to claim 1, wherein the higher temperature is in a range of 80 degrees to 85 degrees Celsius.

11. An energy-saving desalination system, used for obtaining a salt water from a salt-water source and desalinating to generate a fresh water, and the system comprising:
a salt-water magnetizing device disposed at an intake for magnetizing the salt water to generate a magnetized salt water;
a salt-water filtering device coupled to the salt-water magnetizing device for filtering the magnetized salt water;
a salt-water preheating device coupled to the salt-water filtering device for heating the magnetized salt water such that the magnetized salt water can reach a middle temperature;
a nebulization device coupled to the salt-water reheating device to nebulize the magnetized salt water having a higher temperature into a mixing fog;
a mixing-fog heating device coupled to the nebulization device to heat the mixing fog such that the magnetized salt water can maintain in a higher temperature range; and
a condensing device coupled to a salt-water reheating device to condense the mixing fog to extract out a fresh water;
wherein a condensation water required by the condensing device is a salt water extracted from the salt-water source.

12. The desalination system according to claim 11, wherein the salt-water preheating device is a portion of the condensing device.

13. The desalination system according to claim 12, wherein the condensing device includes a fresh-water extraction device and a salt-water extraction device, and the fresh-water extraction device is simultaneously as the salt-water preheating device.

14. The desalination system according to claim 11, wherein the nebulization device includes a pressurization device and a nozzle.

15. The desalination system according to claim 11, wherein the salt-water reheating device can be a solar water heater, an electric heater, a gas water heater, or a combination thereof.

16. The desalination system according to claim 11, wherein the system further includes a re-magnetizing device disposed at a path that the magnetized salt water flows through in order to perform a second magnetization to the magnetized salt water.

17. The desalination system according to claim 16, wherein the salt-water magnetizing device and the re-magnetizing device are realized by a strong magnet.

18. The desalination system according to claim 11, wherein the system further includes a salt-water discharging control valve for discharging an excess condensation water out of the system.

19. The desalination system according to claim 11, wherein the mixing-fog heating device is a solar thermal transfer oil generator.

20. The desalination system according to claim 11, wherein the middle temperature is in a range of 20 degrees to 40 degrees Celsius.

21. The desalination system according to claim 11, wherein the higher temperature is in a range of 80 degrees to 85 degrees Celsius.

22. An energy-saving desalination method for desalinating a seawater to generate a fresh water, and the method comprise steps of:
magnetizing a salt water extracted from the sea;
delivering the salt water after being magnetized to a mixing-fog condensing device as a condensing water, and pre-heating to a middle temperature simultaneously;
further heating the salt water having the middle temperature using an energy-saving heating method to a higher temperature;
nebulizing the salt water with the higher temperature to a mixing fog with the higher temperature;
inputting the mixing fog with the higher temperature to a mixing-fog condensing device to perform a condensation in order to extract a fresh water; and
inputting a remaining portion of the mixing fog after being condensed and extracted with the fresh water to collect a concentrated salt water.

* * * * *